UNITED STATES PATENT OFFICE.

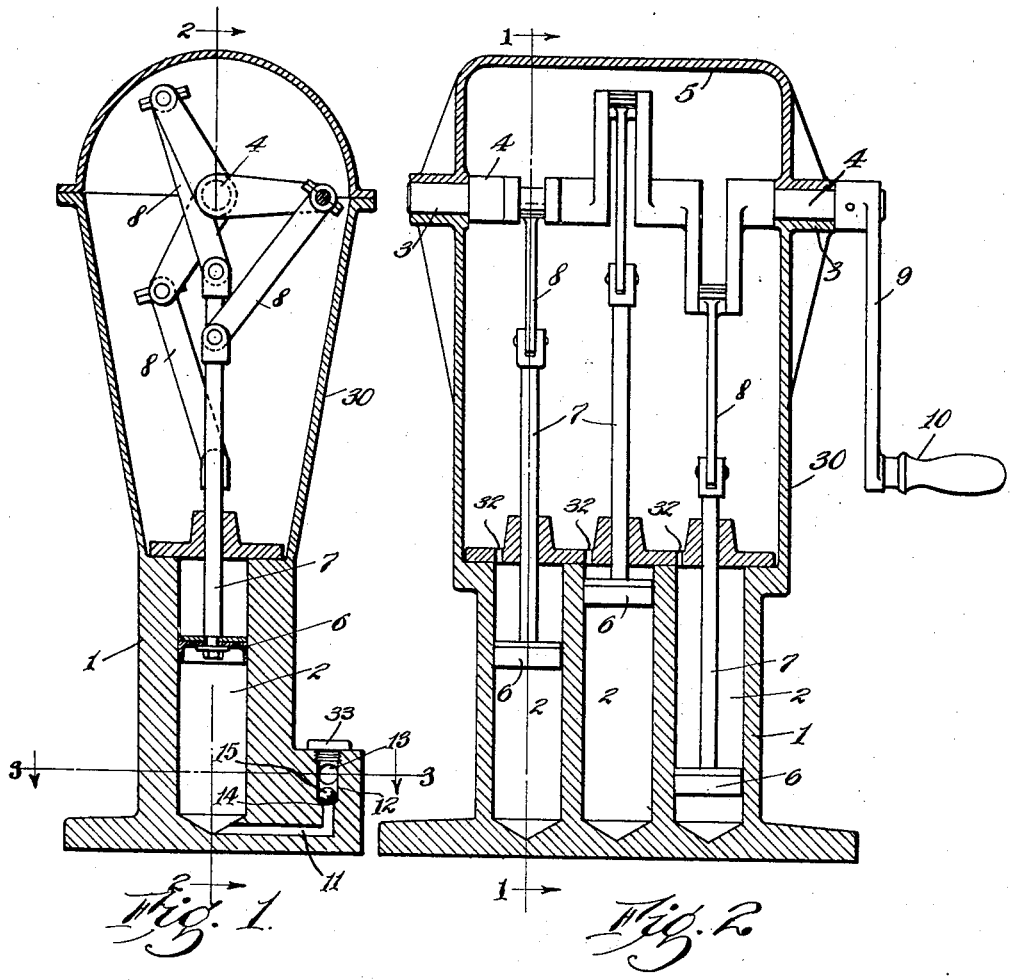
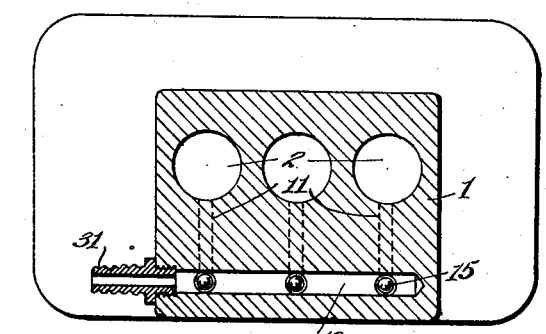

WILLIAM J. WEBB, OF EAST AKRON, OHIO.

MULTICYLINDER PUMP.

1,316,258.

Specification of Letters Patent.   Patented Sept. 16, 1919.

Application filed March 11, 1919.   Serial No. 281,994.

*To all whom it may concern:*

Be it known that I, WILLIAM J. WEBB, a citizen of the United States, residing at East Akron, in the county of Summit and State of Ohio, have invented certain new and useful Improvements in Multicylinder Pumps, of which the following is a specification.

This invention relates to pumps of a type adapted to be used for supplying air to automobile tires but capable of other uses if desired, and has for its object the provision of a pump which will be efficient and easy of operation manually, cheap of manufacture and attractive in appearance. The fact that a clamp may be employed to secure it to the running board of an automobile enhances the ease with which it may be operated.

In the drawings, Figure 1 is a vertical section through one of the cylinders, the sectional plane being indicated on the line 1—1 of Fig. 2. Fig. 2 is a longitudinal section on the line 2—2 of Fig. 1, and Fig. 3 is a horizontal section on the line 3—3 of Fig. 1.

The device comprises a base portion 1 having formed in its lower part cylinders 2, three of such being shown, but it is obvious that more or less may be employed. From the top of the cylinders the walls of the base 1 extend upwardly as shown at 30 and form the lower half of a housing for the operating parts. At the upper end of this housing bearings 3 are provided for a crank shaft 4. The housing is completed by a cap or cover 5 which contains the upper half of the bearings 3. This cap may be bolted or otherwise secured to the housing 30, thus providing a convenient and sufficient closure for the operating parts, which will protect them from injury due to careless handling and exclude dust and dirt, thus eliminating frequent lubrication of the various parts.

Within the cylinders 2 are pistons 6 having pivotally connected to their rods 7 connecting links 8 which have their alternate ends rotatably secured to the respective arms of the crank shaft 4. It may be mentioned here that the arms of the crank shaft are spaced 120 degrees apart, and this construction provides for an even steady flow of air into the tire and reduces the labor necessary to operate the pump. A crank 9 provided with an operating handle 10 is pinned to that part of the crank shaft 4 which extends outside of the housing, allowing for easy operation by hand. Referring to Figs. 1 and 3 it will be seen that outlet passages 11 lead outwardly from the bottoms of the cylinders 2, and then upwardly, and their outer ends have enlarged bores 12. A passage 13 has communication with each of these bores and is provided with a nozzle 31 for the application of an air hose (not shown). At the junction of the bores 11 and 12 a seat 14 is formed for a ball check valve 15, one being supplied for each cylinder. By this construction, if one cylinder becomes inoperative, the other two are not affected, but may continue to supply sufficient air until such time as the broken pump may be repaired. The inlet valves to the cylinders are indicated at 32.

The cylinders and the lower half of the crank case housing may be cast in one piece and the cover in another piece, so that the parts of the pump can be cheaply made and readily assembled. The removable plugs 33 which, as shown, are located in a lateral extension of the base, permit easy access to the valves and outlet passage, so that the valves can be readily replaced when necessary.

I claim:

1. A pump comprising a base portion containing a cylinder and piston and having a lateral extension provided with a valved outlet passage, the base portion having an upwardly projecting housing section, a cover on top of said section, and a crank shaft projecting into the housing and connected to the piston.

2. An upright multi-cylinder pump cast *en bloc* with an integral base and an upwardly extending housing section, the base having connected valved outlet passages therein, pistons in the cylinders, a cover on the top of the housing section, and a crank shaft projecting into the housing and connected to the pistons.

In testimony whereof, I do affix my signature in presence of two witnesses.

WILLIAM J. WEBB.

Witnesses:
JOHN A. BOMMHARDT,
ROBERT L. BRUCK.

Copies of this patent may be obtained for five cents each, by addressing the "Commissioner of Patents, Washington, D. C."